U. H. GOBLE & A. STUART.
HARVESTER.
No. 5,933. Patented Nov. 21, 1848.
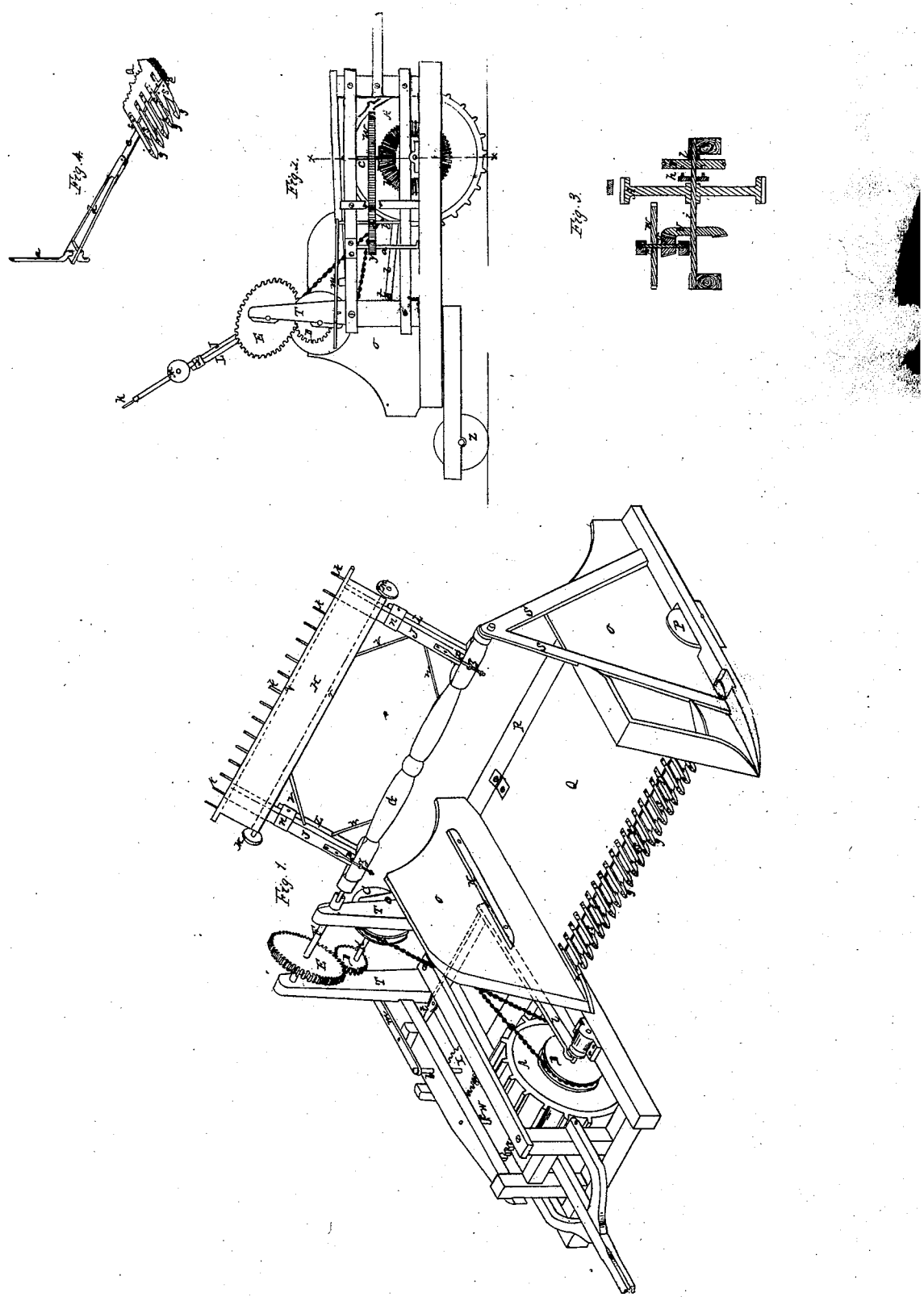

UNITED STATES PATENT OFFICE.

U. H. GOBLE AND A. STUART, OF URBANA, OHIO.

IMPROVEMENT IN HARVESTERS.

Specification forming part of Letters Patent No. 5,933, dated November 21, 1848.

*To all whom it may concern:*

Be it known that we, URIAH H. GOBLE and ALEXANDER STUART, of Urbana, in the county of Champaign and State of Ohio, have invented a new and Improved Harvesting-Machine; and we do hereby declare the following to be a full, clear, and exact description of the features or principle that distinguishes the same from all other machines before known, reference being had to the accompanying drawings, making a part of this specification, in which—

Figure 1 is a perspective view of our harvesting-machine; Fig. 2, a side elevation; Fig. 3, a vertical section in the line $x\,x$ of Fig. 2, and Fig. 4 a perspective view of a portion of the machine detached.

Similar letters indicate like parts in all the figures.

In our improved harvesting-machine we make use of the reciprocating saw-teeth cutting apparatus, the movements connected with which, as well as the general features of the frame-work of the machine, are arranged and constructed as represented in the drawings, or in any well-known or usual manner.

The nature of our invention consists in the combination of an improved self-acting rake, H, with the platform Q, in the rear of the cutting apparatus, and with the gearing of the machine, in the particular manner hereinafter set forth, for the purpose of removing the straw and grain from the platform and depositing the same in smooth and even layers upon the ground for binding. Our improved harvesting-machine rests upon the main driving-wheel A on the shaft $i$ and the auxiliary supporting-wheels P and Z.

$a$ is a vertical crank-shaft, which communicates motion to the cutters through the medium of the pitman $d$. Motion is transmitted to the crank-shaft $a$ from the main shaft $i$, through the medium of the beveled toothed wheel U, (on the shaft $i$,) matching into the bevel-pinion V on the shaft $c$, the toothed wheel W on the shaft $c$ matching into the pinion X on the intermediate shaft, $b$, which pinion X matches into the pinion $y$ on the crank-shaft $a$.

T T are standards rising from the body of the machine, supporting between them the two shafts F K.

S S are inclined braces rising from the corners of the outer extremity of the apron Q, and joined together at their upper ends, forming the supporting-bearing of the outer end of the rotating rake-shaft G. The inner end of the rake-shaft is jointed to and supported by the end of the shaft F, as shown in Fig. 1.

The rake H is connected to the arms L L, projecting from the shaft G, in such a manner that it has a sliding radial motion upon the arms as the shaft is revolved. The rake is composed of the head $q$, let into and secured in the extremities of the arms J J, and the bar $r$, secured to the arms J J, a short distance from and parallel with the rake-head, with a covering of canvas or other suitable material secured to and extending from the bar $r$ to the rake-head. The rake is connected to the shaft G in the manner represented in Fig. 1, to wit: The bands $n\,n$ are secured to the outer ends of the arms L L, and loosely embrace the rake-arms J J. The metallic rods $p\,p$, secured to and projecting from the inner ends of the rake-arms J J, pass through the metallic eyes $z\,z$, the shanks of which are driven into the shaft G, which mode of connection allows the rake to slide freely out and in upon the arms L L as the shaft revolves. When the rake descends below a horizontal position as the shaft revolves its weight causes it to slide outward until it is arrested by the heads at the extremities of the rods $p\,p$ striking against the eyes $z\,z$. When the rake, as it is carried upward by the revolutions of the shaft, rises above a horizontal position its weight causes it to slide inward upon the arms L L, into the position represented in Fig. 1. Rake-teeth $k\,k$, of suitable length and the requisite distance from each other, are let into and project from the rake-head $q$. As the rake revolves, as above set forth, and slides forward on the arms L L, the points of the teeth pass within a very short distance of the front edge of the platform Q, just in the rear of the cutters, where they enter the straw of the grain and conduct the same to the rear. As the rake moves toward the rear the rollers M M on the projecting ends of the bar $r$ pass onto the horizontal ways N, secured to the inner sides of the vertical ends O O of the platform, which ways and rollers, with the manner of attaching the rake to the arms of the shaft, cause the rake to move across the platform in a line parallel thereto, until the points of the rake-teeth reach the adjustable wing R, at the rear edge of the platform, when the rake commences to rise, the teeth passing nearly in contact with the elevated wing R, and as they pass above and to the rear of the wing R the straw of the grain drops vertically from the rake-teeth upon the ground in a smooth and even layer for conveniently gathering up and binding.

Motion is imparted to the rake-shaft G through the medium of a band or chain passing from the pulley B on the main shaft $i$ to and around the pulley C on the shaft K, and the pinion D, placed eccentrically upon the shaft K, matching into the elliptical toothed wheel E on the shaft F, to which the shaft G is jointed. This manner of driving the shaft G gives to it an unequal motion in different portions of its revolution, varying from a very slow to a comparatively rapid movement. At the time that the teeth of the pinion D nearest to its shaft are matching into the teeth of the toothed elliptical wheel E most distant from the shaft F the shaft G will have imparted to it a very slow motion, which movement will gradually increase in speed until the teeth of the pinion D most distant from its shaft matches into the teeth in E nearest to the shaft F, and vice versa. The object of this unequal motion of the rake-shaft G is to give a gradually-diminishing movement to the rake as it passes across the platform, and a very slow motion at the moment that the grain falls from the teeth, for the purpose of allowing the straw to drop evenly from the teeth upon the ground instead of being thrown suddenly rearward therefrom into a tangled heap, which would take place if the rake had a rapid movement at the moment that the straw was discharged therefrom.

In going from place to place with our improved harvesting-machine, the pulley B is allowed to play loosely upon the main shaft $i$ by detaching therefrom the gland $h$, Fig. 3, by means of the lever $l$, Fig. 1, and thereby causing the rake to remain stationary when not required for use.

The cutting apparatus is detached from the driving-shaft $i$, when not required for use, by elevating the shaft $b$ in its bearings by means of the lever $m$, as shown in Figs. 1 and 2, and throwing the pinion X out of gear with the toothed wheel W on the shaft $c$.

What we claim as our invention, and desire to secure by Letters Patent, is—

1. The combination and arrangement by which we cause the rotating rake H to pass horizontally across the platform Q—to wit, securing the rake to the shaft G in such a manner that it can slide freely to and from the same, placing rollers M M upon the projecting ends of the bar $r$, parallel with the rake-head, operating with the horizontal ways N, secured to the inner sides of the vertical ends O O of the platform Q, substantially as herein set forth.

2. The imparting an unequal motion to the rake as it revolves, for the purpose herein set forth, by means of the eccentric pinion D, matching with the elliptical toothed wheel E, substantially as herein set forth.

3. The imparting to the rotating rake a horizontal movement from the front to the rear edge of the platform, combined with a gradually-diminishing rate of speed, substantially in the manner and for the purpose herein set forth.

URIAH H. GOBLE.
ALEXR. STUART.

Witnesses:
WILLIAM O. KELLER,
S. P. CASTLE.